United States Patent
Ma et al.

(10) Patent No.: US 11,314,721 B1
(45) Date of Patent: *Apr. 26, 2022

(54) USER-INTERACTIVE DEFECT ANALYSIS FOR ROOT CAUSE

(71) Applicant: Palantir Technologies Inc., Palo Alto, CA (US)

(72) Inventors: Jason Ma, Palo Alto, CA (US); Allen Cai, Menlo Park, CA (US); Andrew Cooper, Chicago, IL (US); Arnaud Drizard, Paris (FR); Benjamin Lee, London (GB); Damien Cramard, Paris (FR); Damian Rusak, London (GB); Hind Kraytem, London (GB); Jan Matas, London (GB); Ludovic Lay, Paris (FR); Myles Scolnick, New York, NY (US); Radu-Andrei Szasz, London (GB); Stefan Negrus, London (GB); Taylor Cathcart, New York, NY (US); Zhixian Shen, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 828 days.

This patent is subject to a terminal disclaimer.

(21) Appl. No.: 15/928,884

(22) Filed: Mar. 22, 2018

Related U.S. Application Data

(60) Provisional application No. 62/595,980, filed on Dec. 7, 2017.

(51) Int. Cl.
*G06F 16/23* (2019.01)
*G06F 3/04847* (2022.01)
(Continued)

(52) U.S. Cl.
CPC ...... *G06F 16/2365* (2019.01); *G06F 3/04847* (2013.01); *G06F 16/215* (2019.01);
(Continued)

(58) Field of Classification Search
CPC .... G06T 7/001; G06F 11/079; G06F 16/2365; G06F 16/9535
See application file for complete search history.

(56) References Cited

U.S. PATENT DOCUMENTS

| 5,515,488 A | 5/1996 | Hoppe et al. |
| 5,801,965 A | 1/1998 | Takagi et al. |

(Continued)

FOREIGN PATENT DOCUMENTS

| CN | 102546446 | 7/2012 |
| CN | 103167093 | 6/2013 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Mohammad S Rostami
(74) *Attorney, Agent, or Firm* — Sheppard Mullin Richter & Hampton LLP

(57) ABSTRACT

Systems are provided for managing defect data objects. A system stores a plurality of defect data objects that have been input to the system, and generates an issue item including one or more defect data objects that are selected from the stored defect data objects based on user input. The system determines similarity between the one or more defect data objects in the issue item and one or more of the stored defect data objects that are out of the issue item, based on com- (Continued)

parison of one or more parameter values. The system determines one or more candidate defect data objects to be included in the issue item from the one or more of the stored defect data objects that are out of the issue item based on the similarity, and includes one or more of the determined candidate defect data objects in the issue item based on user input.

20 Claims, 6 Drawing Sheets

(51) Int. Cl.
  *G06F 16/215*  (2019.01)
  *G06F 16/25*  (2019.01)
  *G06F 16/22*  (2019.01)
  *G06F 16/9535*  (2019.01)

(52) U.S. Cl.
  CPC ........ *G06F 16/2282* (2019.01); *G06F 16/252* (2019.01); *G06F 16/9535* (2019.01)

(56) References Cited

U.S. PATENT DOCUMENTS

| | | | |
|---|---|---|---|
| 5,905,650 A | 5/1999 | Tsutsui et al. | |
| 5,974,572 A | 10/1999 | Weinberg et al. | |
| 6,246,787 B1 | 6/2001 | Hennessey et al. | |
| 6,336,082 B1 | 1/2002 | Nguyen et al. | |
| 6,430,305 B1 | 8/2002 | Decker | |
| 6,779,159 B2 | 8/2004 | Yokoyama et al. | |
| 6,820,135 B1 | 11/2004 | Dingman | |
| 6,978,419 B1 | 12/2005 | Kantrowitz | |
| 6,980,984 B1 | 12/2005 | Huffman et al. | |
| 7,168,039 B2 | 1/2007 | Bertram | |
| 7,461,077 B1 | 12/2008 | Greenwood | |
| 7,617,232 B2 | 11/2009 | Gabbert et al. | |
| 7,756,843 B1 | 7/2010 | Palmer | |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 7,991,764 B2 | 8/2011 | Rathod | |
| 8,036,971 B2 | 10/2011 | Aymeloglu et al. | |
| 8,037,046 B2 | 10/2011 | Udezue et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,386,377 B1 | 2/2013 | Xiong et al. | |
| 8,473,454 B2 | 6/2013 | Evanitsky et al. | |
| 8,484,115 B2 | 7/2013 | Aymeloglu et al. | |
| 8,489,641 B1 | 7/2013 | Seefeld et al. | |
| 8,577,911 B1 | 11/2013 | Stepinski et al. | |
| 8,589,273 B2 | 11/2013 | Creeden et al. | |
| 8,688,573 B1 | 4/2014 | Ruknoic et al. | |
| 8,744,890 B1 | 6/2014 | Bernier | |
| 8,799,799 B1 | 8/2014 | Cervelli et al. | |
| 8,806,355 B2 | 8/2014 | Twiss et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,069,842 B2 | 6/2015 | Melby | |
| 9,100,428 B1 | 8/2015 | Visbal | |
| 9,111,281 B2 | 8/2015 | Stibel et al. | |
| 9,129,219 B1 | 9/2015 | Robertson et al. | |
| 9,256,664 B2 | 2/2016 | Chakerian et al. | |
| 9,280,618 B1 | 3/2016 | Bruce et al. | |
| 9,286,373 B2 | 3/2016 | Elliot et al. | |
| 10,133,621 B1 | 11/2018 | Skiff et al. | |
| 2001/0020194 A1 | 9/2001 | Takagi et al. | |
| 2002/0065708 A1 | 5/2002 | Senay et al. | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2002/0161532 A1 | 10/2002 | Dor et al. | |
| 2002/0181756 A1 | 12/2002 | Shibuya et al. | |
| 2003/0126102 A1 | 7/2003 | Borthwick | |
| 2004/0034570 A1 | 2/2004 | Davis | |
| 2004/0044484 A1 | 3/2004 | Obara et al. | |
| 2004/0064269 A1 | 4/2004 | Shibuya et al. | |
| 2004/0111480 A1 | 6/2004 | Yue | |
| 2004/0153418 A1 | 8/2004 | Hanweck | |
| 2004/0158409 A1 | 8/2004 | Teshima et al. | |
| 2004/0218806 A1 | 11/2004 | Miyamoto et al. | |
| 2004/0236688 A1 | 11/2004 | Bozeman | |
| 2005/0010472 A1 | 1/2005 | Quatse et al. | |
| 2005/0050210 A1 | 3/2005 | Kennedy | |
| 2005/0086207 A1 | 4/2005 | Heuer et al. | |
| 2005/0097482 A1 | 5/2005 | Hanson et al. | |
| 2005/0154628 A1 | 7/2005 | Eckart et al. | |
| 2005/0154769 A1 | 7/2005 | Eckart et al. | |
| 2005/0271261 A1* | 12/2005 | Onishi | G06T 7/001 382/149 |
| 2006/0026120 A1 | 2/2006 | Carolan et al. | |
| 2006/0026170 A1 | 2/2006 | Kreitler et al. | |
| 2006/0080283 A1 | 4/2006 | Shipman | |
| 2006/0082763 A1 | 4/2006 | Teh et al. | |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2006/0271526 A1 | 11/2006 | Charnock et al. | |
| 2007/0000999 A1 | 1/2007 | Kubo et al. | |
| 2007/0011304 A1 | 1/2007 | Error | |
| 2007/0031982 A1* | 2/2007 | Lim | G01N 21/94 438/14 |
| 2007/0038646 A1 | 2/2007 | Thota | |
| 2007/0047801 A1* | 3/2007 | Kojima | G09G 3/006 382/149 |
| 2007/0150801 A1 | 6/2007 | Chidlovskii et al. | |
| 2007/0156673 A1 | 7/2007 | Maga | |
| 2007/0162454 A1 | 7/2007 | D'Albora et al. | |
| 2007/0185867 A1 | 8/2007 | Maga | |
| 2007/0192122 A1 | 8/2007 | Routson et al. | |
| 2007/0284433 A1 | 12/2007 | Domenica et al. | |
| 2007/0288219 A1* | 12/2007 | Zafar | G06T 7/0008 703/14 |
| 2008/0015802 A1 | 1/2008 | Urano et al. | |
| 2008/0065655 A1 | 3/2008 | Chakravarthy et al. | |
| 2008/0069081 A1 | 3/2008 | Chand et al. | |
| 2008/0077642 A1 | 3/2008 | Carbone et al. | |
| 2008/0103996 A1 | 5/2008 | Forman et al. | |
| 2008/0175466 A1 | 7/2008 | Ishikawa | |
| 2008/0208735 A1 | 8/2008 | Balet et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0270328 A1 | 10/2008 | Lafferty et al. | |
| 2008/0294663 A1 | 11/2008 | Heinley et al. | |
| 2008/0313132 A1 | 12/2008 | Hao et al. | |
| 2009/0076845 A1 | 3/2009 | Bellin et al. | |
| 2009/0094166 A1 | 4/2009 | Aymeloglu et al. | |
| 2009/0094270 A1 | 4/2009 | Alirez et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0132953 A1 | 5/2009 | Reed et al. | |
| 2009/0153673 A1 | 6/2009 | Chu et al. | |
| 2009/0157732 A1 | 6/2009 | Hao et al. | |
| 2009/0187546 A1 | 7/2009 | Whyte et al. | |
| 2009/0187548 A1 | 7/2009 | Ji et al. | |
| 2009/0249244 A1 | 10/2009 | Robinson et al. | |
| 2009/0254842 A1 | 10/2009 | Leacock et al. | |
| 2009/0259636 A1 | 10/2009 | Labrou et al. | |
| 2009/0271343 A1 | 10/2009 | Vaiciulis et al. | |
| 2009/0307049 A1 | 12/2009 | Elliott et al. | |
| 2009/0313463 A1 | 12/2009 | Pang et al. | |
| 2009/0319418 A1 | 12/2009 | Herz | |

(56) References Cited

U.S. PATENT DOCUMENTS

| | | |
|---|---|---|
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131450 A1* | 5/2010 | Nguyen ............... G06N 5/022 706/54 |
| 2010/0131502 A1 | 5/2010 | Fordham |
| 2010/0161735 A1 | 6/2010 | Sharma |
| 2010/0174691 A1* | 7/2010 | Caldwell ............. G06F 16/285 707/696 |
| 2010/0191563 A1 | 7/2010 | Schlaifer et al. |
| 2010/0191731 A1* | 7/2010 | Rus .................... G06F 16/355 707/737 |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0276396 A1 | 11/2011 | Rathod |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0155740 A1* | 6/2012 | Cho ..................... G06T 7/001 382/149 |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0246623 A1 | 9/2012 | Creel |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0263289 A1 | 10/2013 | Vijayan et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0037188 A1 | 2/2014 | Nakagaki et al. |
| 2014/0040371 A1 | 2/2014 | Gurevich et al. |
| 2014/0053091 A1 | 2/2014 | Hou et al. |
| 2014/0056507 A1 | 2/2014 | Doyle et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0097934 A1 | 4/2014 | Su et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244644 A1 | 8/2014 | Mashinchi et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0294052 A1 | 10/2015 | Urmanov et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0179923 A1* | 6/2016 | Chehreghani ......... G06F 16/355 707/637 |
| 2016/0179945 A1* | 6/2016 | Lastra Diaz ........ G06F 16/3334 707/739 |
| 2016/0180557 A1 | 6/2016 | Yousaf et al. |
| 2016/0232254 A1* | 8/2016 | Chehreghani ........... G06F 17/10 |
| 2016/0283862 A1 | 9/2016 | Urmanov et al. |
| 2016/0364428 A1* | 12/2016 | Harris .................... G06F 16/93 |
| 2017/0011091 A1* | 1/2017 | Chehreghani ......... G06F 16/22 |
| 2017/0132724 A1* | 5/2017 | Aqlan ........... G06Q 10/063112 |
| 2017/0140039 A1 | 5/2017 | Neels et al. |
| 2017/0277790 A1* | 9/2017 | Alonso ................ H04L 67/306 |
| 2017/0322930 A1* | 11/2017 | Drew .................... G06F 16/338 |
| 2018/0150607 A1* | 5/2018 | MacLeod ............... G16H 10/20 |

(56) References Cited

U.S. PATENT DOCUMENTS

| | | | |
|---|---|---|---|
| 2018/0173212 | A1 | 6/2018 | Poh et al. |
| 2019/0098039 | A1* | 3/2019 | Gates .................... G06N 7/005 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2008/011728 | 1/2008 |
| WO | WO 2009/110795 | 9/2009 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP Businessobjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gill et al., "Computerised Linking of Medical Records: Methodological Guidelines,".

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

Janssen, Jan-Keno, "WO bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf (English Version).

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

Mixpanel—Mobile Analytics, <https://mixpanel.com/> Printed Jul. 18, 2013 in 13 pages.

Notice of Allowance for U.S. Appl. No. 14/225,084 dated May 4, 2015.

Notice of Allowance for U.S. Appl. No. 14/319,161 dated May 4, 2015.

Notice of Allowance for U.S. Appl. No. 14/323,935 dated Oct. 1, 2015.

Notice of Allowance for U.S. Appl. No. 14/479,863 dated Mar. 31, 2015.

Notice of Allowance for U.S. Appl. No. 14/483,527 dated Apr. 29, 2016.

Notice of Allowance for U.S. Appl. No. 14/552,336 dated Nov. 3, 2015.

Notice of Allowance for U.S. Appl. No. 14/746,671 dated Jan. 21, 2016.

Notice of Allowance for U.S. Appl. No. 14/858,647 dated Mar. 4, 2016.

Notice of Allowance for U.S. Appl. No. 15/654,417 dated Jul. 25, 2018.

Official Communication for European Patent Application No. 14187996.5 dated Feb. 12, 2015.

Official Communication for European Patent Application No. 14187996.5 dated Feb. 19, 2016.

Official Communication for European Patent Application No. 14191540.5 dated May 27, 2015.

Official Communication for European Patent Application No. 14200246.8 dated May 29, 2015.

Official Communication for European Patent Application No. 14200298.9 dated May 13, 2015.

Official Communication for European Patent Application No. 14202919.5 dated May 9, 2016.

Official Communication for European Patent Application No. 15181419.1 dated Sep. 29, 2015.

Official Communication for European Patent Application No. 15184764.7 dated Dec. 14, 2015.

Official Communication for European Patent Application No. 15200073.3 dated Mar. 30, 2016.

Official Communication for European Patent Application No. 15201924.6 dated Apr. 25, 2016.

Official Communication for European Patent Application No. 16152984.7 dated Mar. 24, 2016.

Official Communication for Great Britain Patent Application No. 1404486.1 dated May 21, 2015.

Official Communication for Great Britain Patent Application No. 1404486.1 dated Aug. 27, 2014.

(56) References Cited

OTHER PUBLICATIONS

Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Apr. 14, 2016.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Official Communication for U.S. Appl. No. 15/385,664 dated Jul. 12, 2017.
Official Communication for U.S. Appl. No. 15/448,155 dated Sep. 14, 2017.

(56) References Cited

OTHER PUBLICATIONS

Official Communication for U.S. Appl. No. 15/448,155 dated May 19, 2017.
Official Communication for U.S. Appl. No. 15/654,417 dated Sep. 22, 2017.
Official Communication for U.S. Appl. No. 15/385,664 dated Feb. 8, 2018.
Official Communication for U.S. Appl. No. 15/448,155 dated Jun. 11, 2018.
Official Communication for U.S. Appl. No. 15/654,417 dated May 2, 2018.
Open Web Analytics (OWA), <http://www.openwebanalytics.com/> Printed Jul. 19, 2013 in 5 pages.
Piwik—Free Web Analytics Software, <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
Usermetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 6 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

USER-INTERACTIVE DEFECT ANALYSIS FOR ROOT CAUSE

CROSS REFERENCE TO RELATED APPLICATIONS

This application claims the benefit under 35 U.S.C. § 119(e) of U.S. Provisional Application Ser. No. 62/595,980, filed Dec. 7, 2017, the content of which is incorporated by reference in its entirety into the present disclosure.

FIELD OF THE INVENTION

This disclosure relates to approaches for identifying a root cause of manufacturing process defects.

BACKGROUND

Under conventional approaches, manufacturing process defects are periodically recorded. For example, hundreds, or even thousands, of defects may be recorded daily for a particular manufacturing process, such as the construction of cargo ships or other manufactured goods. Typically, defects are stored in a database which can be accessed by quality engineers or other users. However, existing technologies are insufficient to efficiently manage such large numbers of defects. As a result, defects are often improperly identified or handled, and root causes of defects are often never identified. Although defect information may be digitized and stored in databases, these databases lack sufficient systems for identifying relationships.

SUMMARY

Various embodiments of the present disclosure can include systems, methods, and non-transitory computer readable media. In some embodiments, a system stores a plurality of defect data objects that have been input to the system, and generates an issue item including one or more defect data objects that are selected from the stored defect data objects based on user input. The system determines similarity between the one or more defect data objects in the issue item and one or more of the stored defect data objects that are out of the issue item, based on comparison of one or more parameter values of the one or more defect data objects and the one or more stored defect data objects that are out of the issue item. Then, the system determines one or more candidate defect data objects to be included in the issue item from the one or more of the stored defect data objects that are out of the issue item based on the similarity, and includes one or more of the determined candidate defect data objects in the issue item based on user input.

In some embodiments, the system further determines one or more parameters as potential responsible parameters associated with the issue item based on comparison of one or more parameter values among defect data objects that have been included in the issue item after including of the one or more of the determined candidate defect data objects in the issue item. In some embodiments, the system further generates an action prompt in accordance with the determined potential responsible parameters. In some embodiments, the system further updates attributes of the issue item based on the one or more parameters determined as the potential responsible parameters associated with the issue item.

In some embodiments, the system repeatedly carries out a sequence of the determination of the similarity, the determination of the candidate defect data objects, and the inclusion of the determined candidate defect data objects in the issue item. In some embodiments, the system further tracks the number of defect data objects in the issue item.

In some embodiments, the system further filters the one or more determined candidate defect data objects to be included in the issue item based on user input. In some embodiments, the system further causes a graphical user interface (GUI) for inputting user comments on the issue item to be generated on one or more user devices.

In some embodiments, the system further receives user input to delete the issue item, and determines whether or not a user identifier associated with the user input to generate the issue item matches a user identifier associated with the user input to delete the issue item. Upon determining that the user identifier associated with the user input to generate the issue item matches the user identifier associated with the user input to delete the issue item, the system further deletes the issue item.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system employs user-based and/or computer-based detection of groupings to find root causes of defects. Specifically, a computing system stores a plurality of defect data objects that have been input to the system. The computer system generates an issue item including one or more defect data objects that are selected from the stored defect data objects based on user input. Upon the issue item being generated, the computer system determines a similarity between the one or more defect data objects in the issue item and one or more of the stored defect data objects that are out of the issue item, based on comparison of one or more parameter values of the one or more defect data objects and the stored defect data objects. Then, the computer system determines one or more candidate defect data objects to be included in the issue item from the one or more of the stored defect data objects that are out of the issue item based on the similarity, and includes one or more of the determined candidate defect data objects in the issue item based on user input. The resulting issue item may facilitate a determination and/or identification (e.g., by a user) of one or more potential responsible parameters (or, "root cause") associated with the issue item.

In some embodiments, upon the above process, the computer system may compare parameter values of the defect data objects in the issue item, and generate a graphical user interface (GUI) for a user to determine and/or identify one or more potential responsible parameters associated with the issue item.

Figure 1:
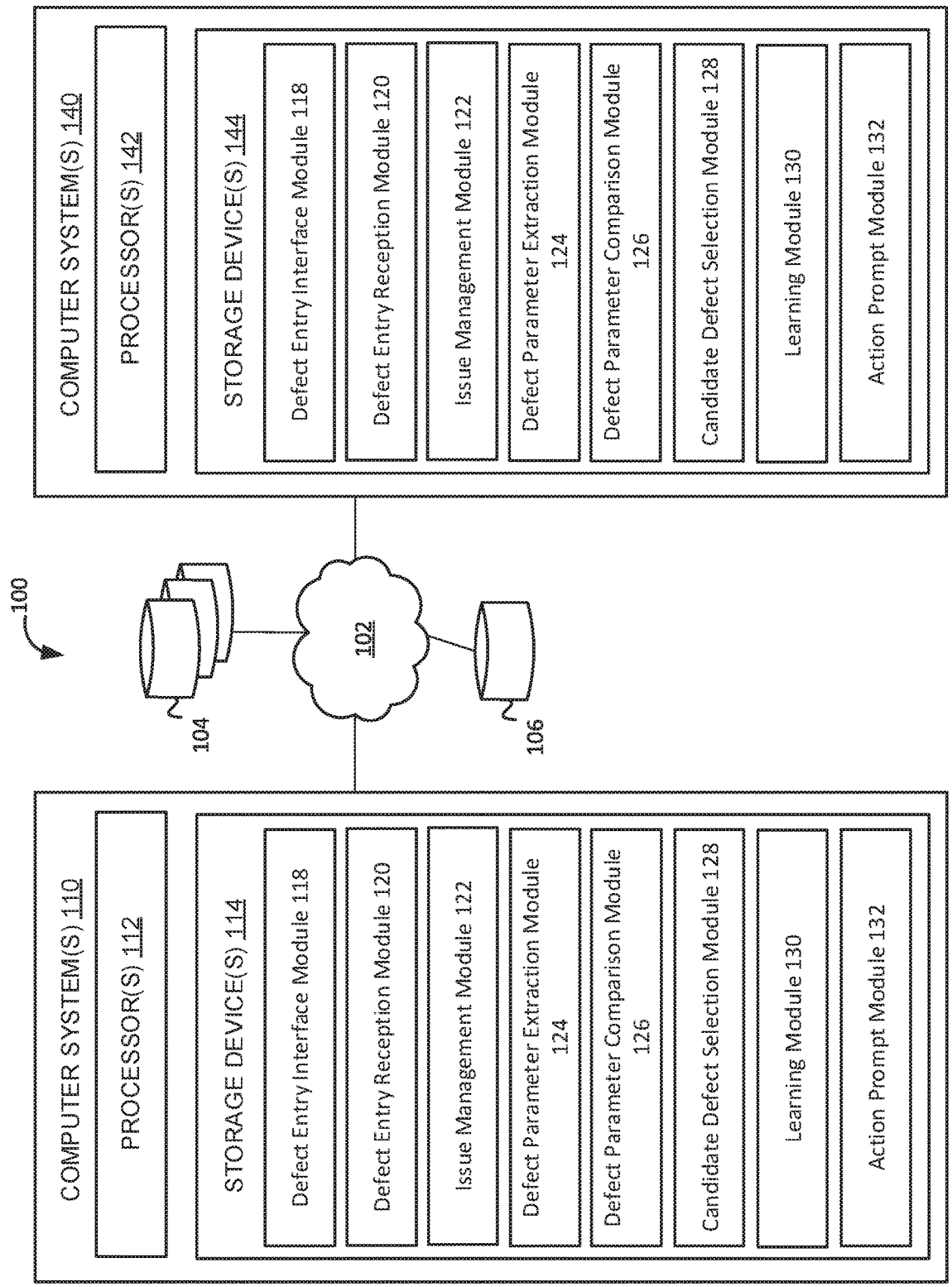
FIG. 1 illustrates an example of a defect management system for managing defect data objects and issue items including one or more defect data objects according to some embodiments.

FIG. 1 illustrates an example of a defect management system 100 for managing defect data objects and issue items including one or more defect data objects according to some embodiments. In the example of the system shown in FIG. 1, the defect management system 100 includes one or more computer systems 110, one or more user device 140, a defect entry database 104, and an issue library in communication via network 102. The defect entry database 104 is illustrated in FIG. 1 as separate from the computer system(s) 110 and the user device(s) 140. In implementations, the defect database 104 may be stored on the computer system(s) 110, the user device(s) 140, or at a remote location.

In the example of the system shown in FIG. 1, one or more of the computer system(s) 110 is intended to represent a computer system configured to provide defect management service. In some embodiments, one or more of the computer system(s) 110 is configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to receive nonconformity data objects, analyze nonconformity data objects, and determine relationships between nonconformity data objects.

Figure 6:
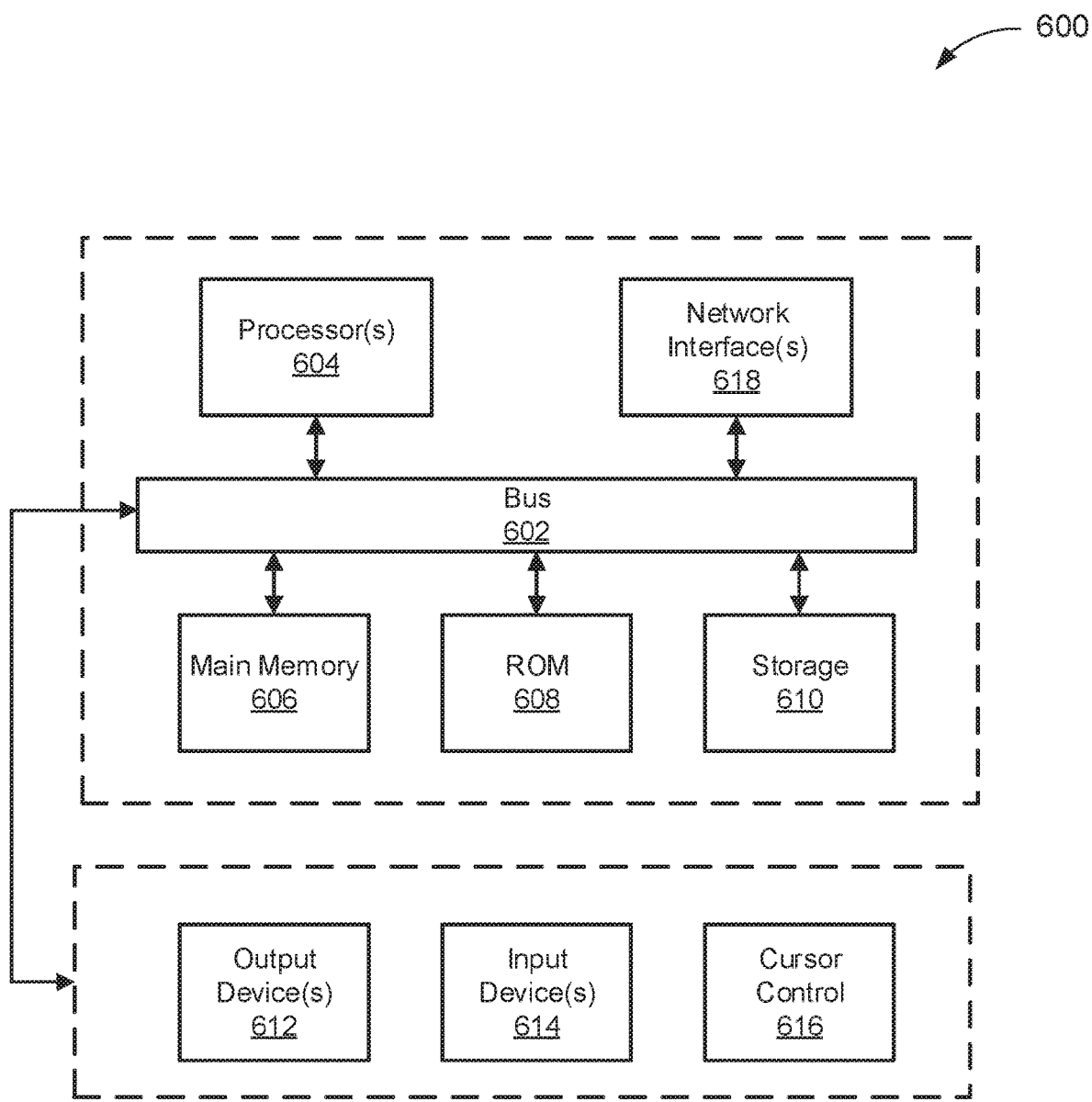
FIG. 6 is a block diagram that illustrates a computer system upon which any of the embodiments described herein may be implemented.

In the example of the system shown in FIG. 1, one or more of the computer system(s) 110 includes one or more processors 112 (also interchangeably referred to herein as processors 112, processor(s) 112, or processor 112 for convenience), one or more storage devices 114, and/or other components. In some embodiments, the processors 112 are programmed by one or more computer program instructions stored on a storage device 114. In some embodiments, the processors 112 are programmed by a defect entry interface module 118, a defect entry reception module 120, an issue management module 122, a defect parameter extraction module 124, a defect parameter comparison module 126, a candidate defect selection module 128, a learning module 130, an action prompt module 132, and/or other instructions that program the computer system 110 to perform various applicable operations, each of which are described in greater detail herein. As used herein, for convenience, the various applicable instruction modules will be described as performing an operation, when, in fact, various applicable instructions program the processors 112 (and therefore computer system 110) to perform the various applicable operations. Further details and features of a computer system 110 configured for implementing features of the described invention may be understood with respect to computer system 600 as illustrated in FIG. 6.

In the example of the system shown in FIG. 1, one or more of the user device(s) 140 is intended to represent a computing system configured to use the defect management service. In some embodiments, one or more of the user device(s) 140 is configured as a server device, a gaming console, a handheld gaming device, a personal computer (e.g., a desktop computer, a laptop computer, etc.), a smartphone, a tablet computing device, and/or other device that can be programmed to receive nonconformity data objects, analyze nonconformity data objects, and determine relationships between nonconformity data objects.

In the example of the system shown in FIG. 1, one or more of the user device(s) 140 includes one or more processors 142 (also interchangeably referred to herein as processors 142, processor(s) 142, or processor 142 for convenience), one or more storage devices 144, and/or other components. In some embodiments, the processors 142 are programmed by one or more computer program instructions. In some embodiments, the processors 142 are programmed by a defect entry interface module 118, a defect entry reception module 120, an issue management module 122, a defect parameter extraction module 124, a defect parameter comparison module 126, a candidate defect selection module 128, a learning module 130, an action prompt module 132, and/or other instructions that program the computer system 110 to perform various applicable operations, each of which are described in greater detail herein. As used herein, for convenience, the various applicable instruction modules will be described as performing various applicable operations, when, in fact, the various applicable instructions program the processors 142 (and therefore the user device 140) to perform the various applicable operations.

In some embodiments, various aspects of the defect management system 100 operate on the computer system(s) 110 and/or on the user device(s) 140. That is, the various modules described herein each operate on one or both of the computer system(s) 110 and/or the user device(s) 140. For example, in an exemplary implementation, a user device 140 comprising a smartphone runs the defect entry interface module 118, permitting a technician or quality control engineer to enter information about an identified defect into the user device 140 as a defect entry. Then, the user device 140 communicates with the computer system(s) 110 via the network 102, and the computer system(s) 110 receives information of the defect entry via the defect entry reception module 120 and performs various applicable functions via the issue management module 122, the defect parameter extraction module 124, the defect parameter comparison module 126, the candidate defect selection module 128, and the action prompt module 130. Other potential divisions of features between the user device(s) 140 and the computer system(s) 110 may be implemented without departing from the scope of the invention.

In some embodiments, the defect entry interface module 118 serves as a software module in operation on the computer system(s) 110 and/or on the user device(s) 140. In a more specific implementation, the defect entry interface module 118 includes programming instructions that cause the computer system(s) 110 and/or the user device(s) 140 to generate a graphical user interface (GUI) for user input to specify and generate a defect entry.

In some embodiments, the defect entry reception module 120 serves as a software module operating on the computer system(s) 110. In a more specific implementation, the defect entry reception module 120 includes programming instructions that cause the computer system(s) 110 to receive information of a defect entry (hereinafter defect entry information) and generate a defect data object (e.g. defect data object 210 in FIG. 2). The defect entry information may be received from the user device(s) 140 and/or any other system in communication with the computer system(s) 110. The defect entry information may be entered via the defect entry interface module 118 and communicated to the defect entry reception module 120 and/or may be supplied to the defect entry reception module 120 via any other applicable means.

In some embodiments, the defect entry reception module 120 is configured to create a defect data object upon receiving defect entry information. In some implementations, the defect entry reception module 120 may be configured to receive a defect data object created by other software applications. In some implementations, the defect reception module 120 may be configured to obtain a defect data object stored in other locations, for example, external databases. The defect reception module 120 may be configured to access the defect entry database 104 to store generated defect data objects.

In some implementations, the issue management module 122 serves as a software module in operation on computer system 110 and/or on user device 140. In some implementations, the issue management module 122 includes programming instructions that cause the computer system(s) 110 and/or the user device(s) 140 to generate and manage issue items based on the defect data objects.

In some embodiments, the issue management module 122 is configured to generate a graphical user interface (GUI) for user input to specify and generate an issue item, and to include one or more stored defect data objects (e.g., stored in the defect entry database 104). That is, an issue item may comprise one or more defect data objects that are selected based on user input as being related to one another across one or more attributes. For example, a series of defect data objects that identify a defect in the same part produced on the same machine may indicate a root cause of the defects to be from that machine. Issue items may include significantly more complex relationships between defect data objects than this, and defect data object(s) in an issue item may be related to one another by varying degrees across various attributes. In some embodiments, the issue management module 122 is configured to search and filter the stored defect data objects to find one or more defect data objects to be included in an issue item based on user input.

In some embodiments, the issue management module 122 is configured to access the issue item library 106 to store data of the generated issue items. In a specific implementation, the issue management module 122 stores metadata of the generated issue items in the issue item library 106, without storing one or more defect data objects included in the issue items in the issue item library 106. In implementations, the issue item library 106 may be stored on the computer system(s) 110, the user device(s) 140, or at a remote location. Issue items may include all or a portion of the information of the defect data objects that comprise them. In some implementations, an issue item includes data fields for defect data object IDs (which may point to the underlying defect data object), issue quality scores, and other relevant information.

In some embodiments, the issue management module 122 is configured to update the generated issue items, for example, by adding additional defect data object(s) to the generated issue items. When the issue management module 122 adds an additional defect data object to a generated issue item, the additional defect data object may be selected from candidate defect data objects (which are determined by the candidate defect selection module 128 as set forth below) based on user input or selected from stored defect data objects based on user input.

In some embodiments, the issue management module 122 is configured to suggest an issue item from the issue item library 106 that may correspond to one or more defect data objects selected by the user. A user may, through a user interface, review the data of one or more defect data objects. A user may select one or more defect data objects. Based on the user selection, the issue management module 122 may suggest a stored issue item to which the user may wish to add the selected defect data objects. For example, an engineer may be reviewing a list of newly discovered defect data objects. The engineer may note that several of the defect data objects appear to have similar features and may further note that comparison value scores between the new defect data objects indicate that they are highly related. The engineer may then seek to determine if the new defect data objects should be added to an existing, known, issue item. In response to the user's request to determine a known issue item for the new defect data objects, the issue management module 122 may suggest a potential matching issue item. Issue module may suggest a potential matching issue item according to the comparison value scores between the new defect data objects and the defect data objects of the potential matching issue item. For example, the issue management module 122 may determine a temporary issue quality score for the issue item if the new defect data objects were to be added. If the temporary issue quality score represents an increase of the issue quality score based on the addition of the defect data objects, or does not decrease beyond a threshold, the issue management module 122 may suggest the issue item as a potential match. The issue management module 122 may suggest multiple issue items, for example in a ranked list, according to the likelihood of their being matches.

In some implementations, the issue management module 122 is configured to suggest that a new issue item be created based on one or more selected defect data objects. A user viewing a selected group of one or more defect data objects may determine that the defect data objects are related, and provide a request to the system to suggest an issue item or additional defect data objects that may correspond. In some implementations, the issue management module 122 may fail to determine a potentially matching issue item. The issue management module 122, responsive to a failure to determine a potentially matching issue item, may suggest the creation of a new issue based on the selected defect data objects. The issue management module 122 may suggest additional defect data objects as potentially related to the group of one or more defect data objects by suggesting the defect data objects having the best comparison value scores with respect to the group of one or more defect data objects. In some implementations, all defect data objects surpassing a predetermined threshold in the comparison value score may be suggested. In some implementations, a predetermined number of the highest rated defect data objects based on comparison value scores may be suggested. The issue management module 122 may generate a new issue data object based on the defect data objects corresponding to the selected defect data objects.

In some embodiments, the issue management module 122 is configured to determine one or more parameters of defect data objects in an issue item as potential responsible parameter(s) associated with the issue item. In a specific implementation, the issue management module 122 causes the defect parameter extraction module 124 to extract parameters of defect data objects in the issue item as set forth below, and causes the defect parameter comparison module 126 to compare extracted parameters of the defect data objects in the issue item as set forth below.

In some embodiments, the issue management module 122 is configured to track the number of defect data objects included in an issue item, after the potential responsible parameter(s) associated with the issue item are determined (and also the action prompt module 132 generates an action prompt associated with the issue item, as set forth below). When the number of defect data objects is unchanged or decreases (if deletion of a defect data object from the issue item is enabled), a user may determine that the potential responsible parameter(s) are root cause(s) of a defect. To the contrary, when the number of defect data objects increases or is unchanged (even if deletion of a defect data object from the issue item is enabled), a user may determine that one or more of the potential responsible parameter(s) are not root cause(s) of a defect. In some embodiments, the issue management module 122 is configured to generate a GUI indicating the tracked number of defect data objects in an issue item, so as to provide visualized information of the tracked number to users. In some embodiments, the issue management module 122 may determine the root cause.

In some embodiments, the issue management module 122 is configured to receive user input to delete the issue item. Upon receiving the user input to delete the issue item, the issue management module 122 determines whether or not a user identifier associated with the user input to generate the issue item matches a user identifier associated with the user input to delete the issue item. Upon determining that the user identifier associated with the user input to generate the issue item matches the user identifier associated with the user input to delete the issue item, the issue management module 122 deletes the issue item. Such functionality of the issue management module 122 enables limited deletion authority to specific user(s), for example, a user that generated an issue item. In some embodiments, the issue management module 122 non-restrictively allows deletion of the issue item by users.

In some embodiments, the issue management module 122 is configured to cause a graphical user interface (GUI) for inputting user comments on an issue item to be generated on one or more user devices. In some embodiments, the user comments include discussion threads among users involved in or associated with the issue item and/or defect data objects included in the issue item. In some embodiments, the issue management module 122 is further configured to send messages to one or more user devices to notify the issue item to one or more user devices. Depending on a specific implementation of the embodiments, the message may be emails, text message, social network message, or any other applicable messages.

In some embodiments, the defect parameter extraction module 124 serves as a software module in operation on the computer system(s) 110 and/or on the user device(s) 140. In some embodiments, the defect parameter extraction module 124 includes programming instructions that cause the computer system(s) 110 and/or the user device(s) 140 to extract parameter information from data fields of the defect data objects (e.g., the defect data objects 210 in FIG. 2). In some embodiments, the defect parameter extraction module 124 is configured to perform parameter extraction steps on structured data fields (e.g., unstructured data fields 211 and structured data fields 212 in FIG. 2). Parameter extraction may include an analysis of various data fields of the defect data objects to generate additional information related to the parameter data objects. Newly-generated information may be stored with the original defect data object, as additional extracted parameter data fields (e.g., extracted parameter data fields 213 in FIG. 2), in a newly-created defect data object, which may include only the extracted parameters, and/or in any other permanent or temporary data format that is suitable. Although the current discussion refers to extracted parameters being stored in the original defect data object, this is for exemplary purposes only.

In some embodiments, the defect parameter extraction module 124 performs parameter extraction with respect to a group of stored defect data objects and another group of stored defect data objects. In a specific implementation, the defect parameter extraction module 124 performs parameter extraction with respect one or more stored defect data objects included in an issue item (issue item 310 in FIG. 3) and one or more stored defect data objects not included in the issue item.

In some embodiments, the defect parameter extraction module 124 performs parameter extraction on structured data fields of stored defect data objects. Parameter extraction on structured data fields of stored defect data objects may include the extraction of a predetermined subset of specific data fields relevant to defect analysis. In some implementations, the defect parameter extraction module 124 implements a transform, translation, normalization, and/or other operation on a data field of a defect data object in extracting a parameter. For example, where a part has been given a new number, all versions of that part stored under the old part number may be updated to the new during a parameter extraction step.

In some embodiments, the defect parameter extraction module 124 performs parameter extraction on unstructured data fields of stored defect data objects. Parameter extraction on unstructured data fields of defect data objects may include performing image analysis on image data, performing automatic speech recognition on audio data, performing both image analysis and automatic speech recognition on video data, and/or performing textual analysis on text data. Parameter extraction on unstructured data fields may return parameter analysis information capable of being compared to parameter analysis information of a similar type.

In some embodiments, the defect parameter extraction module 124 performs parameter extraction on textual information using a TF-IDF (term frequency-inverse document frequency) method, as follows. In some implementations, textual information may be translated to a common language prior to analysis. In some implementations, text may be analyzed without translation. In some implementations, text may be parsed via the use of various text parsing tools, including, for example, a stemmer tool configured to break words down into word stems. Stemming tools may be useful when performing word frequency analysis, as various forms of the same word may all be counted as the same word.

In some implementations, translation includes the use of a defect specific key-word dictionary. Engineering terms may not translate directly based on standard translation dictionaries. For example, due to language idiosyncrasies and usage patterns, the French or Spanish description of a defect may not match the English description after translation. Accordingly, foreign language words for defect description may be specifically mapped to their translated equivalents by the defect specific key-word dictionary.

After initial text preparation, TF-IDF may proceed. Each word stem (or word, if stemming has not been performed), may have a TF-IDF score computed for it. The TF-IDF for each word stem may be computed by the equation tf-idf(t, d)=(# times term t occurs in document d)*log((# documents)/(1+(#documents containing term t))). Thus, the formula multiplies the term frequency by the inverse document frequency. The term frequency is computed as the number of times the term t appears in the document d. The inverse document frequency is computed as the logarithm of the total number of documents divided by one plus the number of documents containing the term t. Terms that occur more frequently in all documents may have a low IDF, while rare terms may have a high IDF. As can be seen, the term inside the logarithm of the IDF calculation approaches one as the number of documents containing the term increases. Thus, the IDF approaches zero. Accordingly, for extremely common words such as 'the,' 'an,' etc., the TF-IDF score approaches zero. Thus, the TF-IDF method scores each word stem based on how frequently it appears in a document offset by how frequently it appears throughout other documents. As used by the defect parameter extraction module 122, the TF-IDF method may be performed on unstructured text fields (e.g., defect description) of defect data objects as documents. The documents to which each unstructured text field is compared may include unstructured text fields of all defect data objects stored in the defect entry database 104.

In some implementations, the defect parameter extraction module 124 computes the IDF of one or more terms in the defect data objects stored in the defect entry database 104 and store IDF information in association with the defect entry database 104. IDF information may be stored for a predetermined number of terms, and may be filtered based on a document frequency of each term. Computing and storing IDF information of terms in the defect entry database 104 may reduce a computational load during parameter extraction. For example, when computing TF-IDF results for a defect data object that is newly introduced to the defect entry database 104, the defect parameter extraction module 124 may compute term frequencies for word stems in the new document and compare with the stored IDF values to compute TF-IDF values. The defect parameter extraction module 124 may further update the stored IDF values when new data is introduced to the defect entry database 104.

In some implementations, the defect parameter extraction module 124 is configured to perform TF-IDF analysis on an audio data field after an automatic speech recognition process is performed on the audio data.

In some embodiments, the defect parameter comparison module 126 serves as a software module in operation on the computer system(s) 110 and/or on the user device(s) 140. In some embodiments, the defect parameter comparison module 126 includes programming instructions that cause the computer system(s) 110 and/or the user device(s) 140 to compute comparison values between defect data objects stored in the defect entry database 104. In some embodiments, the defect parameter comparison module 126 performs comparison of parameter values between one or more defect data objects (hereinafter, referred to as "target defect data objects") and one or more other defect data objects stored in the defect entry database 104. In a more specific implementation, the defect parameter comparison module 126 performs comparison of parameter values between one or more target defect data objects included in an issue item (e.g., the issue item 310 in FIG. 3) and one or more defect data objects not included in the issue item. The comparison results of these computations may be stored with defect data object in a related data field, or in any other suitable data structure.

In some embodiments, the defect parameter comparison module 126 performs parameter comparison with respect to a group of stored defect data objects and another group of stored defect data objects. In a specific implementation, the defect parameter comparison module 126 performs parameter comparison with respect one or more stored defect data objects included in an issue item (issue item 310 in FIG. 3) and one or more stored defect data objects not included in the issue item.

The comparison results of parameter values may be stored as comparison sets, including at least a comparison result (e.g., matching degree) and a defect entry ID of one or more defect data objects that are being compared to target defect data object(s). Comparison sets may be stored in the defect entry database 104 and/or in the issue item library 106 with the associated defect data object(s), and or in any other suitable data format. In some implementations, a predetermined number of comparison sets may be stored. In some implementations, the comparison sets having the highest scoring comparison values up to the predetermined number may be stored. In some implementations, an unlimited number of comparison sets may be stored. In some implementations, a predetermined threshold comparison value score may be used to determine which comparison sets are to be stored.

In some implementations, comparison results among defect data objects may be computed as pairwise distances, according to the following equation:

$$d(n_1, n_2) = a_0^* d_{TF-IDF}(n_1, n_2) + \sum_{i=1}^{N} a_i^*(1 - \delta(n_1[i], n_2[i])).$$

In the pairwise distance equation, $a_0, a_1, a_2,$ etc. correspond to feature weights. Thus, according to the equation, a pairwise distance between two defect data objects $n_1$ and $n_2$ may be computed as a sum of weighted distances computed based on the unstructured data fields (e.g., $a_0^* d_{TF-IDF}(n_1, n_2)$), and weighted distances computed based on structured data fields (e.g., $$\sum_{i=1}^{N} a_i^*(1 - \delta(n_1[i], n_2[i]))$$

The first term in the pairwise distance computation is a weighted distance between unstructured data fields of two defect data objects. A distance between unstructured data fields may be computed based on a comparison of TF-IDF scores of the unstructured data fields of each defect data object. The distance computation may be weighted by a feature weight factor. The distance computation may be based on a comparison between the highest ranking word stems of each defect data object as measured by the TF-IDF score. The distance computation may be based on a comparison between TF-IDF scores of the highest ranking word stems of each defect data object. Where the highest ranking word stems have less in common, a computed distance will be greater. An exemplary formula for computing the distance between TF-IDF scores may be as follows:

$$d_{TF-IDF}(n_1, n_2) = \sum_{w=1}^{N} a_w \sqrt{|n_{1,tf-idf(w)} - n_{2,tf-idf(w)}|}.$$

In the exemplary formula, $n_{1,tf-idf(w)}$ and $n_{2,tf-idf(w)}$ represent the TF-IDF scores for two defects n1 and n2 for a particular word, w. The formula computes the sum, weighted by a factor $a_w$, of the square-roots of the absolute values of the differences in TF-IDF scores for each word of the vocabulary v, in common between two defect data objects $n_1$ and $n_2$. The factor $a_w$ may differ for each word w. The provided formula is exemplary only, and other methods of computing distances between TF-IDF scores between two defect data objects may be used without departing from the scope of the technology.

The second term in the pairwise distance computation includes a summation of weighted comparisons between one or more of the structured data fields of two defect data objects. Each structured data field that matches (i.e., $1-\delta(n_1[i], n_2[i])$ resolves to zero) between two defect data objects contributes zero to a distance summation. Each structured data field that does not match contributes an amount equal to a corresponding feature weight to the distance summation. Thus, defect data objects having a higher number of matches will have a lower distance between them.

Adding the unstructured distance term to the structured distance term yields a total pairwise distance between two defect data objects. Lower distances indicate that two defect data objects are more closely related.

As discussed above, the defect parameter comparison module 126 may compute comparison results and generate comparison data sets for each defect data object stored in the defect entry database 104. In some implementations, the comparison data sets may be stored in, with, or in association with defect data objects in the defect entry database 104. In some implementations, defect data objects including comparison data sets may be exported by the defect parameter comparison module 126 to the issue item library 106. The defect parameter comparison module 126 may access the issue item library 106 to store comparison value information in the issue item library 106. The defect parameter comparison module 126 may further store any or all information associated with the defect data objects in the issue item library 106.

In some implementations, the defect parameter comparison module 126 may be configured to reduce comparison value computation loads. Techniques for reducing computation loads may include reducing the number of defect data objects between which comparison values are computed and prioritizing the calculation of terms based on feature weights. Reducing the number of defect data objects between which comparison values are computed may be performed by computing comparison values only between defect data objects that share certain criteria, e.g., input with a same time frame, an exact match on a specific field, etc.

In another implementation, data fields may be prioritized in a computation based on feature weights. For example, during a pairwise distance computation, terms with higher feature weights may be computed first. The summation in the pairwise distance calculation may be computed in an ongoing fashion, as each next data field is compared. When the distance calculation surpasses a predetermined threshold indicating no relationship, the computation of the distance between the two nonconformities may be halted. For example, highly related defect data objects share a venue (e.g., plant) very frequently, and thus a comparison between the plant data fields of defect data objects may be highly weighted. When computing distance between two defect data objects that do not share a venue, this computation may add significantly to the total distance between the defect data objects. By computing this term, and other terms that have the potential to add significantly to the total distance, first, the defect parameter comparison module 126 may reduce the total number of computations necessary because it may be determined that the two defect data objects are not related well before all data fields are compared.

In some embodiments, the candidate defect selection module 128 serves as a module in operation on the computer system(s) 110 and/or on the user device(s) 140. In some embodiments, the candidate defect selection module 128 includes programming instructions that cause the computer system(s) 110 and/or the user device(s) 140 to select one or more defect data objects as candidate defect data objects to be added to an issue item.

In some embodiments, the candidate defect selection module 128 selects one or more defect data objects for the candidate defect data objects from stored defect data objects that are not included in an issue item, based on the comparison data sets obtained by the defect parameter comparison module 126. In a more specific implementation, the candidate defect selection module 128 selects one or more defect data objects for the candidate defect data objects based on a matching degree of the defect data object with one or more defect data objects included in an issue item. For example, the candidate defect selection module 128 selects one or more defect data objects for the candidate defect data objects, when the matching degree is greater than a threshold (e.g., 80%).

A matching degree may be a measure of relatedness of one or more defect data objects included in an issue item with a defect data object that has not been included in the issue item (hereinafter referred to as potential candidate defect data object). The matching degree may include an aggregate measure of the comparison values between the one or more defect data objects in the issue item and the potential candidate defect data object. In some implementations, a matching degree may be computed as an average of comparison values as calculated between each defect data object within the issue item and the potential candidate defect data object. In another example, the matching degree may be based on a probability that defect data objects to be highly related to defect data objects to be included in the issue item are also within the issue item.

In some embodiments, the candidate defect selection module 128 is configured to facilitate a user's interaction with determined candidate defect data objects. In some implementations, the candidate defect selection module 128 is configured to filter the candidate defect data objects based on applicable filtering criteria based on user input. For example, the applicable filtering criteria include type of candidate defect data objects, and/or keywords and date associated with the candidate defect data objects. In some implementations, the candidate defect selection module 128 is configured to add one or more of the candidate defect data objects selected based on user input to a corresponding issue item.

In some implementations, when the candidate defect selection module 128 selects one or more candidate defect data objects to be added to an issue item, a user may, through a GUI, review the data of one or more candidate defect data objects, and select one or more candidate defect data objects. Based on the user selection, the candidate defect selection module 128 may add the one or more candidate defect data objects selected based on the user selection to the issue item. For example, an engineer may be reviewing a known issue item. The engineer may wish to know whether any newly discovered defect data objects should be classified within that issue item. In response to the user's request to determine one or more candidate defect data objects related to an issue item, the candidate defect selection module 128 may suggest one or more potential matching defect data objects. In some implementations, the candidate defect selection module 128 suggests potential matching defect data objects according to comparison value scores between defect data objects in the issue item and the new potential matching defect data objects. The candidate defect selection module 128 may suggest multiple defect data objects, for example, in a ranked list, according to the likelihood of their being matches.

In some embodiments, the learning module 130 is a software module in operation on computer system 110 and/or on user device 140. In some embodiments, the learning module 130 includes programming instructions that cause computer system 110 and/or user device 140 to compute feature weights based on training data.

In some embodiments, the learning module 130 is configured to implement machine learning processes to determine appropriate feature weights as used by the defect parameter comparison module 126. As discussed above, relationships between a group of defect data objects may be computed as comparison values according to feature weights. Formulas for computing the comparison values may be weighted by feature weights stored in applicable datastore, e.g., the defect entry database 104.

Stored feature weights may be established by the learning module 130 based on training data. Training data may comprise a plurality of predetermined issue items, each including a plurality of defect data objects. Issue items may include a plurality of defect data objects, each of which may have a comparison value score with respect to each other defect data object within the issue item. Machine learning techniques may be employed by the learning module 130 based on the predetermined issue items to maximize the issue quality scores across the issue items by adjusting the feature weights.

In some embodiments, the learning module 130 is further configured to update feature weights based on newly-added defect data objects into issue items. As discussed above, the system may afford a user the opportunity to determine new issue items, add defect data objects to existing issue items, and remove defect data objects from existing issue items. Modification of issue items may cause the learning module 130 to update feature weights based on the modification. For example, in reviewing a series of defect data objects, a user may determine that the grouping of defect data objects is sufficiently related so as to constitute an issue item.

In some embodiments, the action prompt module 132 serves as a module in operation on the computer system(s) 110 and/or on the user device(s) 140. In some embodiments, the action prompt module 132 includes programming instructions that cause the computer system(s) 110 and/or the user device(s) 140 to generate an action prompt to be performed for the purpose of solving the issue item and/or reducing defect entries associated with the issue item. In a more specific implementation, the action prompt includes an instruction to be provided to users (e.g., engineers) of relevant section to perform remedial actions with respect to the issue item based on the potential responsible parameters determined by the issue management module 122.

Although illustrated in FIG. 1 as a single component, the computer system(s) 110 and the user device(s) 140 may each include a plurality of individual components (e.g., computer devices) each programmed with at least some of the functions described herein. In this manner, some components of the computer system(s) 110 and/or the user device(s) 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

Additionally, the modular software breakdown as illustrated in FIG. 1 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The defect entry database 104 and the issue item library 106 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The databases may comprise one or more such databases that reside in one or more physical devices and in one or more physical locations. The database may store a plurality of types of data and/or files and associated data or file descriptions, administrative information, or any other data.

Figure 2:
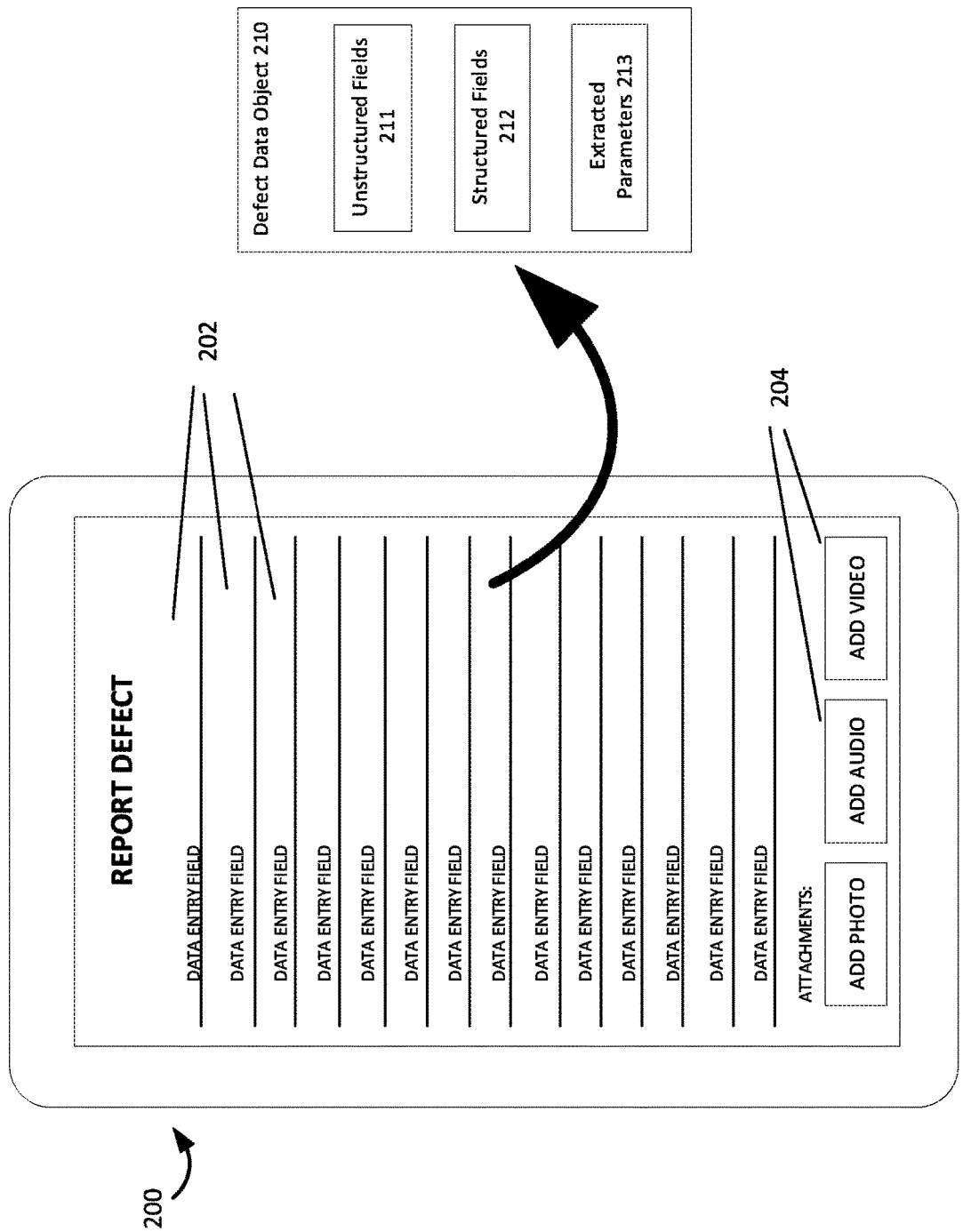
FIG. 2 illustrates an example of a defect entry interface according to some embodiments.

FIG. 2 illustrates an example of a defect entry interface 200 according to some embodiments. In the example shown in FIG. 2, the defect entry interface 200 is intended to represent a GUI generated and presented by an applicable module such as the defect entry interface module 118 in FIG. 1. In some embodiments, the defect entry interface 200 includes one or more data entry fields 202 and one or more attachment options 204. In some embodiments, the data entry fields 202 enable an operator to enter defect information. In some embodiments, the attachment options 204 enable an operator to add attachments to a defect entry, including, for example, photos, audio, and video. In some embodiments, based on the defect information entered to the data entry fields 202 and/or attachments added to the attachment options 204, a defect data object 210 is generated. In some embodiments, the defect data object 210 include unstructured fields 211, structured fields 212, and extracted parameter fields 213.

In some embodiments, the defect data object 210 may refer to information of a defect in manufactured and/or assembled items including deviations from specification(s), standard(s), expectation(s), and/or requirement(s) for a manufacturing process, such as for the construction of vehicles, buildings, consumer items, and/or other manufactured objects. The defect data object 210 may be generated by an applicable module such as the defect entry interface module 118 in FIG. 1 based on user input during and/or after user detection of defects in the items. For example, during an inspection of a manufacturing line/process for a consumer object, an engineer may detect a faulty component. The engineer may gather data about the faulty component/process (e.g., location of fault, type of fault, materials involved, description of fault, photo/video of fault, etc.). The gathered data may be received by an applicable module such as the defect entry interface module 118 in FIG. 1 after the inspection (e.g., the engineer inputs the data through the defect entry interface 200 presented by an application running on a computer) or during the inspection (e.g., the engineer inputs the data through the defect entry interface 200 presented by an application running on a mobile device).

As another example, the engineer may be running a defect entry application on a mobile device (e.g., phone, tablet). During the inspection of the manufacturing line/process, the engineer may detect and gather information about items with defects. Using the defect entry application on the mobile device, the engineer may create new defect entries and/or edit existing defect entries. For individual defect entries, the engineer may enter one or more information into different fields that identifies different properties of the defect, such as location rating, plant, station, manufacturer's serial number, article code, cause code, code specific to relevant industry/standards, defect code, work order identification, element, zone, moment of detection, responsible personnel/group, section of the object, description, photo, audio, video, and/or other properties of the nonconformity item. Information about the defect entries may be recorded as free text, using set codes/terms, and/or in multiple languages. Information about the defect entries may be recorded periodically or non-periodically. The entered information may be added to a database running in a server when the mobile device/defect entry application syncs with the server. The syncing may be performed on a periodic basis, upon completion of entering information about a defect entry and/or based on manual command for syncing.

In some embodiments, the defect data object 210 may be a data object including data fields to accommodate any and all applicable information about a defect as determined by engineer, including all of the information described above and any other applicable information that may be relevant to a particular manufacturing process or manufacturing plant. In an exemplary embodiment, the defect data object 210 may store information in the unstructured fields 211 and the structured fields 212. The structured data fields 212 may be fields requiring a selection of one or more items from a predetermined list of items. For example, the structured fields 212 may include damage codes, plant names, station names, cause codes, material codes, part numbers, etc. The structured fields 212 may include any applicable defect information that is selected from a predetermined list of potential entries. The unstructured fields 211 may include fields permitting a user to enter additional information about a defect without specific entry requirements. The unstructured data fields 211 may include, for example, free text fields, audio fields, video fields, and photo fields. The defect data object 210 may further be configured to store data and/or information created during analysis of the defect data object 210, e.g., in extracted features fields 213, as discussed above.

Figure 3:
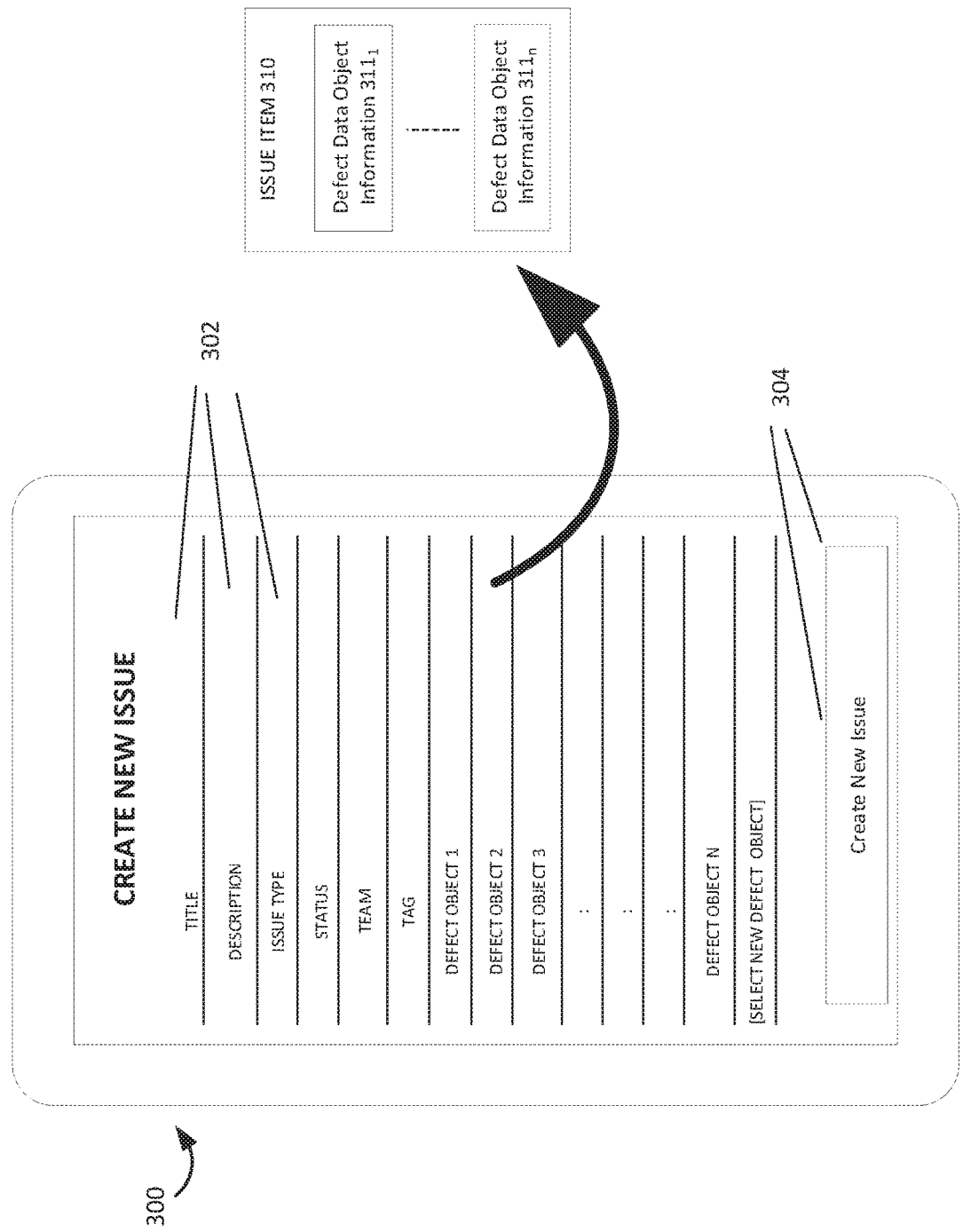
FIG. 3 illustrates an example of an issue creation interface according to some embodiments.

FIG. 3 illustrates an example of an issue creation interface 300 according to some embodiments. In the example shown in FIG. 3, the issue creation interface 300 is intended to represent a GUI generated and presented by an applicable module such as the issue management module 122 in FIG. 1. In some embodiments, the issue creation interface 300 includes one or more data entry fields 302 and a selectable object to create a new issue item. In some embodiments, the data entry fields 302 enable an operator to enter issue information. In some embodiments, the selectable object 304 enables an operator to create a new issue item 310 based on information entered in the data entry fields 302. In some embodiments, the issue item 310 includes one or more pieces of defect data object information $311_1$-$311_n$, which correspond to defect data objects logically included in the issue item 310.

In some embodiments, the issue item 310 refers to information of an issue comprising one or more defect data objects of the same or similar defects in manufactured and/or assembled items including deviations from specification(s), standard(s), expectation(s), and/or requirement(s) for a manufacturing process, such as for the construction of vehicles, buildings, consumer items, and/or other manufactured objects. The issue item 310 may be generated by an applicable module such as the issue management module 122 in FIG. 1 based on user input to select one or more defect data objects that have been generated through user.

In some embodiments, the defect data object information $311i$-$311n$ corresponds to defect data objects respectively and include metadata of the corresponding defect data objects, which include database location of the corresponding defect data objects in defect entry database (e.g., the defect entry database 104 in FIG. 1) and information corresponding to unstructured fields (e.g., the unstructured fields 211 in FIG. 2), structured fields (e.g., the structured fields 212 in FIG. 2), and/or extracted parameters (e.g., the extracted parameters 213 in FIG. 2) with respect to each defect data object logically included in the issue item 310.

Figure 4:
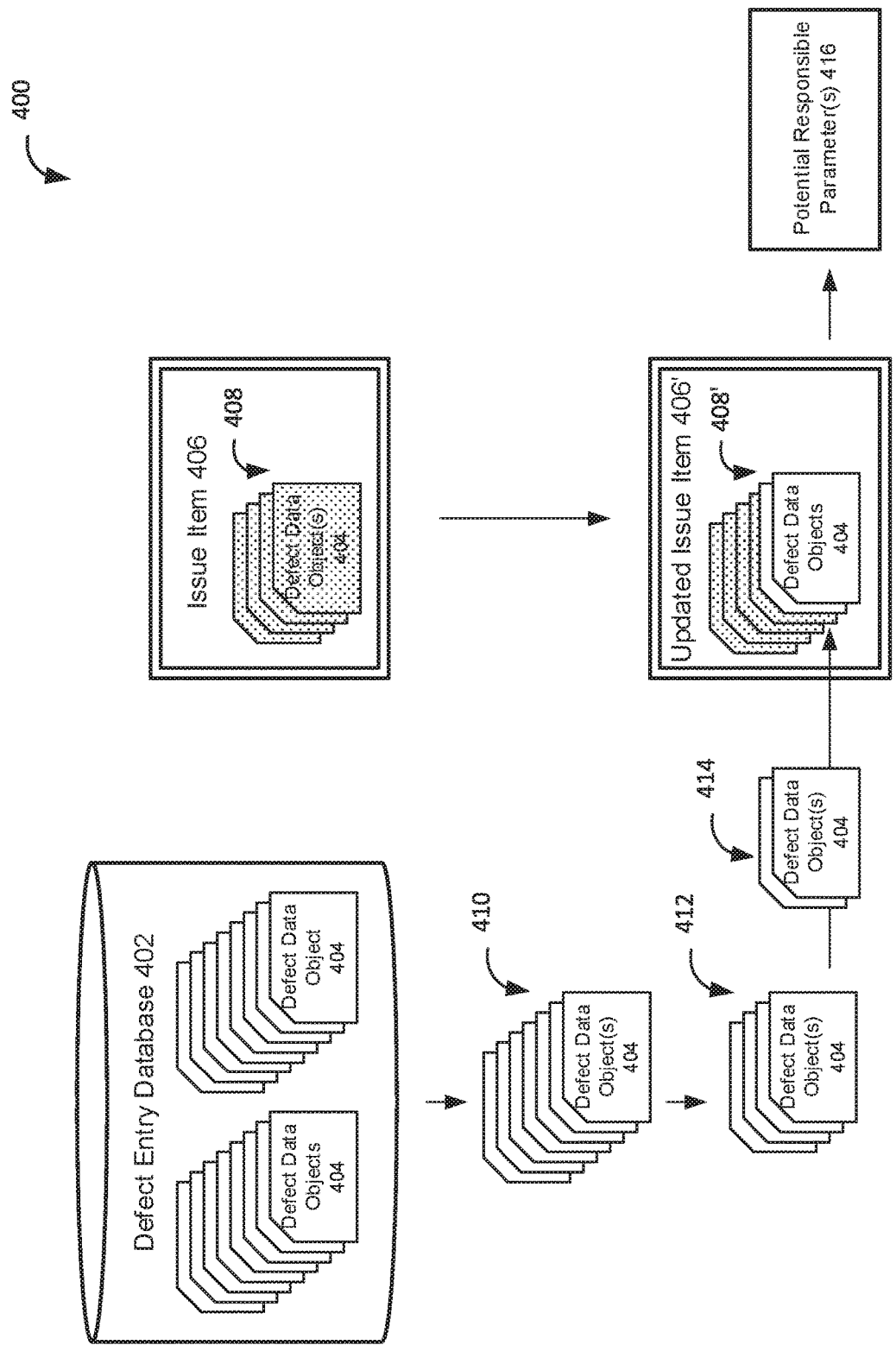
FIG. 4 is a schematic sequence diagram of an example of a method for managing defect data objects and issue items according to some embodiments.

FIG. 4 is a schematic sequence diagram 400 of an example of a method for managing defect data objects and issue items according to some embodiments. In some embodiments, a defect entry database 402 depicted in FIG. 4 corresponds to the defect entry database 104 depicted in FIG. 1. Also, one or more of defect data objects 404 depicted in FIG. 4 correspond to the defect data object 210 depicted in FIG. 2, and an issue item 406 (and an updated issue item 406') depicted in FIG. 4 correspond to the issue item 310 depicted in FIG. 3.

When a new defect data object 404 is generated based on user input for defect entry, the generated defect data object 404 is stored in the defect entry database 404. Further, based on information included in the generated defect data object 404, e.g., data included in unstructured fields and structured fields, parameters are extracted and the extracted parameters are added to the generated defect data object 404. As a result of storing a newly-generated defect data object, a large number of defect data objects 404 are accumulated in the defect entry database 404.

When a new issue item 406 is generated based on user input to create a new issue item, one or more of the accumulated defect data objects 404 in the defect entry database 404 are selected based on user input, and logically added to the created new issue item 406. In some implementations, the selection of one or more of the accumulated defect data objects 404 is carried out first by filtering the accumulated defect data objects 404 based on applicable criteria, which may be determined based on user profile (e.g., user division) or user input (e.g., dates, defect type, etc.), and then selected from the filtered defect data objects 404 based on user input. As a result of the generated issue item 406 logically includes a set 408 of one or more defect data objects 404.

When the new issue item 406 with the set 408 of one or more defect data objects 404 is generated, parameter values of extracted parameters included in the one or more defect data objects 404 in the set 408 are determined, and also parameter values of corresponding parameters included in the one or more defect data objects 404 that are not included in the set 408 are determined. Further, the determined parameter values of the one or more defect data objects 404 in the set 408 are compared with the determined parameter values of the one or more defect data objects 404 that are not included in the set 408 are compared. Then, based on the comparison of parameter values, part of the one or more defect data objects 404 that are not included in the set 408 are selected as candidate defect data object(s) 410 to be added to the issue item 406. In a specific implementation, defect data objects having same or similar parameter values as the parameter values of the one or more defect data objects 404 in the set 408 are selected as the candidate defect data object(s) 410.

After the candidate defect data object(s) 410 are selected, the candidate defect data object(s) 410 are filtered based on applicable criteria, which may be determined based on user profile (e.g., user division) or user input (e.g., dates, defect type, etc.), into filtered candidate defect data object(s) 412. Depending on a specific criteria, the candidate defect data object(s) 410 may be the same as the filtered candidate defect data object(s) 412. Also, depending on a specific criteria, no defect data object may remain as the filtered candidate defect data object(s) 412. In that case, the filtering of the candidate defect data object(s) 410 may be performed again using different filtering criteria.

After the filtered candidate defect data object(s) 412 are determined, one or more of the filtered candidate defect data object(s) 412 is selected to be included into the issue item 406 as additional defect data object(s) 414 based on user input. Depending on a specific criteria, the filtered candidate defect data object(s) 412 may be the same as the additional defect data object(s) 414, when the selection based on the user input designate all of the filtered candidate defect data object(s) 412. As a result, the issue item 406 is updated to an updated issue item 406' including the set 408 of one or more defect data objects 404 and the additional defect data object(s) 414, which are collectively referred to as an updated set 408' of defect data objects.

After the updated issue item 406' is created, parameter values of defect data objects included in the updated issue item 406' (i.e., the updated set 408' of defect data objects) are compared, such that a user can determine one or more parameters that are likely to be associated with a root cause of a defect as potential responsible parameter(s) 416. In a specific implementation, one or more parameter of which parameter values show most similarity among parameters of the defect data objects in the updated issue item 406' can be determined by a user as the potential responsible parameter(s) 416. In the alternative, depending on a specific implementation of the embodiment, an applicable algorithm to determine the potential responsible parameter(s) 416 can be provided to the user.

Figure 5:
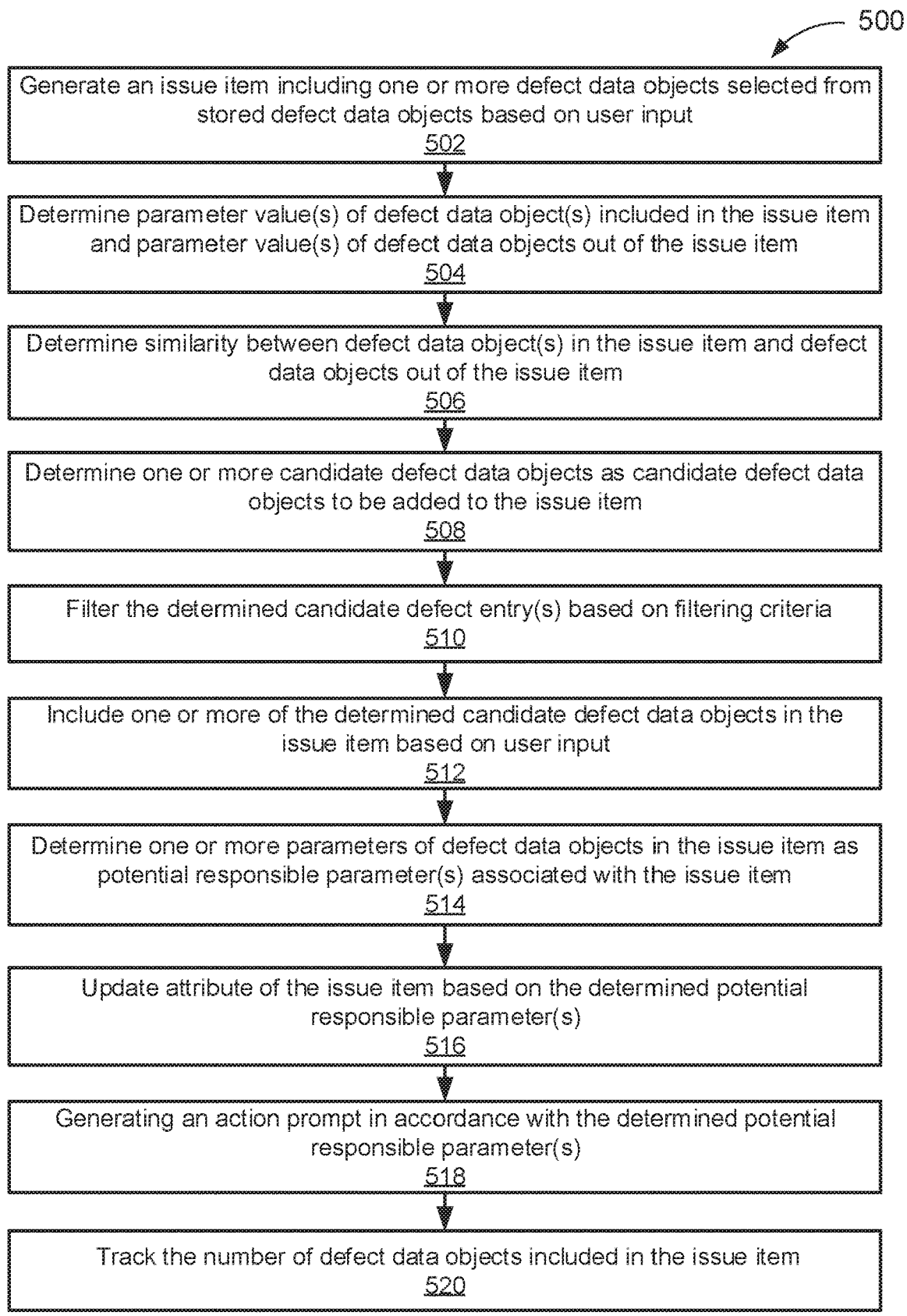
FIG. 5 is a flowchart of an example of a method for managing defect data objects and issue items according to some embodiments.

FIG. 5 is a flowchart 500 of an example of a method for managing defect data objects and issue items according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In module 502 of FIG. 5, an issue item logically including one or more defect data objects selected from stored defect data objects based on user input is generated. An applicable module for generating an issue item, such as the issue management module 122 in FIG. 1, generate the issue item. It is noted here that the issue item may or may not include actual defect data objects, and if the actual defect data objects are not included in the issue item, metadata of the actual defect data objects may be included in the issue item.

In module 504 of FIG. 5, parameter value(s) of defect data object(s) included in the issue item generated in module 502 and parameter value(s) of defect data objects out of the issue item (i.e., not in the issue item) are determined. In some embodiments, defect data objects out of the issue item are not included in any issue items that are created or active (e.g., stored in issue item library). In some embodiments, the parameter value(s) of defect data object(s) included in the issue item generated in module 502 and parameter value(s) of defect data objects out of the issue item are extracted in advance, by an applicable module, such as the defect parameter extraction module 124 in FIG. 1 when each detect data object is generated by an applicable engine such as the defect entry reception module 120 in FIG. 1. An applicable module for determining parameter values, such as the issue management module 122 in FIG. 1, determines the parameter values based on the extracted parameter values in advance.

In module 506 of FIG. 5, similarity between the determined parameter value(s) of defect data object(s) in the issue item and the determined parameter value(s) of the defect data objects out of the issue item is determined based on extracted parameter value(s). An applicable module for comparing similarity, such as the defect parameter comparison module 126 in FIG. 1, determines the similarity between the determined parameter value(s).

In module 508 of FIG. 5, based on the determined similarity, one or more defect data objects out of the issue item is selected as candidate defect data object(s) to be added to the issue item generated in module 502. An applicable module for selecting candidate defect data objects, such as the candidate defect selection module 128 in FIG. 1, selects one or more defect data objects out of the issue item as the candidate defect data object(s).

In module 510 of FIG. 5, the candidate defect data object(s) determined in module 508 is filtered based on a filtering criteria. An applicable module for filtering the candidate defect data object(s), such as the candidate defect selection module 128 in FIG. 1, filters the candidate defect data object(s). In some embodiments, the filtering criteria is generated based on user input (date, defect types, etc.), and/or user profile (e.g. user identifier, user division, user location, etc.).

In module 512 of FIG. 5, from the filtered candidate defect data object(s) obtained in module 510, one or more filtered candidate defect data object(s) selected based on user input are logically added to the issue item generated in module 502. An applicable module for adding defect data objects to an issue item, such as the issue management module 122 in FIG. 1, adds one or more of the filtered candidate defect data object(s) into the issue item. In some embodiments, the modules 504-512 are carried out repeatedly at applicable timing designated or triggered by an applicable criteria, such as user input and/or user profile, such that the defect analysis reflects newly added defect data objects.

In module 514 of FIG. 5, one or more parameters of defect data objects in the issue item are determined as potential responsible parameter(s) associated with root cause(s) of the issue item. An applicable module for determining potential responsible parameter(s), such as the issue management module 122 in FIG. 1, determines one or more parameters as the potential responsible parameter(s).

In module 516 of FIG. 5, based on the determined potential responsible parameter(s), attribute of the issue item generated in module 512 is updated based on the determined potential responsible parameter(s). An applicable module for updating attributes of an issue item, such as the issue management module 122 in FIG. 1, updates attribute of the issue item. In some embodiments, the attributes are the same as the determined potential responsible parameter(s), or modified information indicating that priority or ranking of association to the root cause(s) based on parameter values of the determined potential responsible parameter(s).

In module 518 of FIG. 5, an action prompt may be generated by a user in accordance with the determined potential responsible parameter(s). An applicable module for generating an action prompt, such as the action prompt module 132 in FIG. 1, generate an action prompt. In some embodiments, the generated action prompt is provided to one or more users (e.g., engineers) associated with the determined potential responsible parameter(s) as a work prompt message.

In module 520 of FIG. 5, the number of defect data objects included in the issue item is tracked. An applicable module for tracking the number of defect data objects included in the issue item, such as the issue management module 122 in FIG. 1, tracks the number of defect data objects included in the issue item. In some embodiments, when the number of defect data objects is unchanged or decreases (if deletion of a defect data object from the issue item is enabled), the potential responsible parameter(s) are determined to be root cause(s) of a defect. To the contrary, when the number of defect data objects increases or is unchanged (even if deletion of a defect data object from the issue item is enabled), one or more of the potential responsible parameter(s) are not root cause(s) of a defect.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 504. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
storing defect data objects that have been inputted to the system in a database accessible by the system;
receiving, from a user, a selection of one or more defect data objects from the defect data objects;
generating an issue data object for the one or more selected defect data objects by analyzing data stored in data fields of the one or more selected defect data, wherein the issue data object includes a common defect documented in the one or more selected defect data objects, wherein analyzing the data stored in the data fields of the one or more selected defect data objects comprises:

parsing the data stored in the data fields into words;
computing, for each parsed word, a score for the word; and
determining the common defect documented in the one or more selected defect data objects based on scores computed for the data stored in the data fields of the one or more selected defect data objects;
determining similarities between the issue data object and other defect data objects in the database, wherein the similarities are determined based on comparing pairwise distances from a representation of the issue data object to representations of the other defect data objects in a space;
determining, based on the pairwise distances in the space, one or more candidate defect data objects in the other defect data objects to be included in the issue data object, wherein pairwise distances from representations of the one or more candidate defect data objects to the representation of the issue data object are within a threshold distance in the space; and
providing the one or more candidate defect data objects, as suggestions, to be included in the issue data object.

2. The system of claim 1, wherein the instructions, when executed, further cause the system to perform:
generating a graphical user interface (GUI) to provide the one or more candidate defect data objects for selection by the user.

3. The system of claim 2, wherein the instructions, when executed, further cause the system to perform:
generating an action prompt, through the GUI, for selection of the one or more candidate defect data objects by the user.

4. The system of claim 2, wherein the instructions, when executed, further cause the system to perform:
in response to receiving a user selection of the one or more candidate defect data objects, updating attributes of the issue data object to include parameters associated with the selected candidate defect data objects.

5. The system of claim 1, wherein determining the similarities between the issue data object and the other defect data objects is carried out in response to a new defect data object being stored in the database.

6. The system of claim 1, wherein the instructions, when executed, further cause the system to perform:
tracking a number of defect data objects included in the issue data object.

7. The system of claim 1, wherein the instructions, when executed, further cause the system to perform:
filtering, based on one or more filter criteria, the one or more candidate defect data objects to be included in the issue data object, wherein the one or more filter criteria are based on scores of words associated with data stored in data fields of the one or more candidate defect data objects.

8. The system of claim 1, wherein the instructions, when executed, further cause the system to perform:
generating a graphical user interface (GUI) on a user device accessing the database, the GUI allowing user comments associated with the issue data object to be inputted.

9. The system of claim 1, wherein the instructions, when executed, further cause the system to perform:
receiving a user input to delete the issue data object;
determining that a user identifier associated with the user input to delete the issue data object matches a user identifier associated with the user associated with the generation of the issue data object; and upon determining that the user identifiers match, deleting the issue data object.

10. The system of claim 1, wherein the defect data objects include words, images, audio, or video describing a defect.

11. The system of claim 1, wherein the data stored in the data fields of the one or more selected defect data objects includes audio data, wherein at least one speech recognition technique is performed on the audio data to transcript the audio data into one or more words.

12. The system of claim 1, wherein the data stored in the data fields of the one or more selected defect data object includes image data, wherein at least one image recognition technique is performed on the image data to generate one or more words describing objects depicted in the image data.

13. The system of claim 1, wherein a score for a word represents a relative frequency of the word in a data field relative to other words.

14. The system of claim 1, wherein the instructions further cause the system to perform:

determining that the one or more selected defect data objects do not include a common defect; and generating a new issue data object to be filled out by the user.

15. The system of claim 1, wherein the technique comprises a term frequency-inverse document frequency (TF-IDF) technique.

16. A computer-implemented method comprising:

storing defect data objects that have been inputted to a computing system in a database;

receiving, from a user, a selection of one or more defect data objects from the defect data objects;

generating an issue data object for the one or more selected defect data objects by analyzing data stored in data fields of the one or more selected defect data objects, wherein the issue data object includes a common defect documented in the one or more selected defect data objects, wherein analyzing the data stored in the data fields of the one or more selected defect data objects comprises:

parsing the data stored in the data fields into words;

computing, for each parsed word, a score for the word; and determining the common defect documented in the one or more selected defect data objects based on scores computed for the data stored in the data fields of the one or more selected defect data objects;

determining similarities between the issue data object and other defect data objects outside in the database, wherein the similarities are determined based on comparing pairwise distances from a representation of the issue data object to representations of the other defect data objects in a space;

determining, based on the pairwise distances in the space, one or more candidate defect data objects in the other defect data objects to be included in the issue data object, wherein pairwise distances from representations of the one or more candidate defect data objects to the representation of the issue data object are within a threshold distance in the space; and providing the one or more candidate defect data objects, as suggestions, to be included in the issue data object.

17. The computer-implemented method of claim 16, further comprising:

generating a graphical user interface (GUI) to provide the one or more candidate defect data objects for selection by the user.

18. The computer-implemented method of claim 17, further comprising:

generating an action prompt, through the GUI, for selection of the one or more candidate defect data objects by the user.

19. The computer-implemented method of claim 17, further comprising:

in response to receiving a user selection of the one or more candidate defect data objects, updating attributes of the issue data object to include parameters associated with the selected candidate defect data objects.

20. The computer-implemented method of claim 16, wherein determining the similarities between the issue data object and the other defect data objects is carried out in response to a new defect data object being stored in the database.

* * * * *